Patented July 14, 1936

2,047,220

UNITED STATES PATENT OFFICE 2,047,220

CHEMICAL COMPOSITIONS AND PROCESSES FOR MIXING THE SAME

Gordon D. Patterson and James H. Peterson, Wilmington, Del., assignors to E. I. du Pont de Nemours & Company, Wilmington, Del., a corporation of Delaware No Drawing. Application March 15, 1935.
Serial No. 11,320

20 Claims. (Cl. 91—68)

This invention relates to aqueous dispersions and more particularly to dispersions of solids in aqueous solutions of salts of deacetylated chitin.

This invention has as an object the preparation of dispersions of a finely divided solid or solids in an aqueous solution of a salt of deacetylated chitin. A further object is the dispersion thus produced. A still further object is a coated or impregnated article comprising a base material to which pigments or other finely divided solids are anchored by means of deacetylated chitin or derivative thereof. A still further object is a process for the preparation of such coated articles. Other objects will apear hereinafter.

These objects are accomplished by the following invention wherein a dispersion is made by agitating a finely divided substantially water insoluble and unreactive solid infusible under the conditions of dispersion in an aqueous solution of a salt of deacetylated chitin, the resultant dispersion being used in the coating, sizing, impregnation, etc., of a base material.

This invention deals with a material only recently available to the art, namely, acid soluble partially deacetylated chitin. In copending application of George W. Rigby, Serial No. 731,600, filed June 21, 1934, there is disclosed a method for the preparation of suitable deacetylated chitin. In this method shrimp, lobster or crab shells, freed from contaminant adherent material, such as flesh, by treatment with 1% solution of soda ash at the boiling temperature, then freed from lime salts by treatment with 5% hydrochloric acid followed by a second boiling with 1% soda ash solution, is deacetylated by treatment with caustic alkali at an elevated temperature for a considerable time, for example, with 40% sodium hydroxide at 110° C. for about four hours. The material thus obtained contains from 20% to 90% and preferably 70% to 90% of its nitrogen in the form of free amino groups.

The viscosity of the solutions made from the deacetylated chitin is markedly influenced by the treatment. More drastic treatment than that given above results in a material of considerable lower viscosity. Less drastic treatment than that above described results in a material of increased viscosity. A material obtained by a given treatment may be increased in viscosity by heating for a suitable length of time, or decreased in viscosity by the addition of suitable oxidizing agent, such as hydrogen peroxide, to an aqueous solution of a salt or to a suspension of the solid.

The Rigby application mentioned above discloses the preparation of numerous soluble salts of this material.

The acetate of deacetylated chitin has been largely used because of its ready availability, low cost and ease of use, and the volatility of acetic acid, but other acids which form water soluble salts with deacetylated chitin may also be used, such as formic, adipic, sebacic, anthranilic, lactic, tartaric, benzoic, pyruvic, succinic, maleic, and hydrochloric acids. The soluble nitrourea salt may be used altho this is sensitive to heat. Many of the salts do not foam, some foam slightly and others very badly on vigorous agitation. In general, the salts of the longer chain or higher molecular weight acids foam more than the lower molecular weight acids. With the acetate, formate, maleate, tartrate, etc., almost no foaming takes place unless caused by the dispersed material.

Aqueous solutions of salts of deacetylated chitin have been found to be generally effective in the dispersion of non-reactive, substantially water-insoluble, materials which are solid under the conditions of preparation of the dispersion. By non-reactive solid is meant a solid which neither reacts with deacetylated chitin with the formation of a precipitate nor neutralizes the weak acid with which the deacetylated chitin is put into solution. While a relatively insoluble reactive material may frequently be dispersed, the dispersion usually sets to a gel after a shorter or longer period of time, i. e., when sufficient of the reactive material has dissolved to react with the deacetylated chitin or to neutralize the acid. Sulfates such as calcium sulfate even tho sparingly soluble, are especially reactive due to the unusual insolubility of the sulfate of deacetylated chitin.

In preparing dispersions, solutions of salts of deacetylated chitin may be used as such and the pigment or other solid material added with suitable mechanical treatment or the pigment and the dry deacetylated chitin may be mixed together dry and dilute aqueous acid added with suitable mechanical agitation when dispersion is desired. Special compositions may also be made by simply drying or by coagulating deacetylated chitin dispersions with ammonia or other alkaline material and drying. The dry materials may be re-dispersed by adding sufficient acid and stirring.

The dispersions may be made by a number of processes which combine the deflocculation of aggregates to ultimate particles with suspension of those particles in the liquid. The solid material and the aqueous solution of the salt of deacetylated chitin may be mixed together and put thru any of the mechanical means known to the art. The colloid mill represents a preferred apparatus in the preparation of dispersions altho the slower pebble mill grinding is also effective. Simple stirring for example with an efficient stirrer is often sufficient. For certain purposes it is desirable to perform considerable mechanical work upon the material to be dispersed as for example by mixing the pigment-like material with a rather viscous solution of the salt of deacetylated chitin in a Werner-Pfleiderer or Banbury type mixer, edge runner, roll mill, or the like.

The invention is applicable to a wide variety of organic and inorganic materials to be dispersed, a wide variety of salts of deacetylated chitin usable, and a wide variety of viscosities of these salts. A variety of additional materials may be added to the dispersion to increase its usefulness. The ratio of deacetylated chitin to dispersed material may be varied greatly as well as the concentrations of dispersed materials. Different dispersions may be mixed with each other and with emulsions. The dispersions may be greatly diluted. In general, there is no excessive foaming in the preparation of the dispersions. The dispersions are resistant to deterioration. Dispersions may be improved by heating. In the examples deacetylated chitin is used in solution as the salt, and unless otherwise stated, as the acetate, the proportion, unless otherwise stated, being referred to deacetylated chitin as such and not to the salt, and being based on the dispersed material at 100%.

Dispersions generally are described as good, fair or poor. For very small particle size good dispersions settle very slowly and usually leave a cloudy layer, fair dispersions settle slowly, while poor dispersions usually settle out within a day as contrasted with settling within a few minutes for undispersed material. A drop of a good dispersion added to a large volume of water diffuses uniformly into water, the rate depending upon the viscosity of the dispersion, while fair or poor dispersions will clot or flocculate instead. As compared to undispersed systems, dispersions are usually high in fluidity. Brownian movement is largely present in good dispersions, while fair and poor dispersions will show numerous clumps or flocculates of solid when viewed under the microscope. For material of larger particle size, the above effects may be modified since good dispersions will not show Brownian movement and settling will be very appreciable or rapid. The effect of the dispersing agent can readily be noted, however.

While the more finely divided and/or low density pigments usually require more dispersing agent, 5% to 10% of deacetylated chitin to dispersed material has been found to be a very useful range with 10% to 25% sometimes desirable. 0.1% has been found to have a very definite effect, while 500% or more has been used in certain cases. The actual upper limit is determined only by the viscosity of the dispersion and for low proportions of dispersed materials may be very high. On the basis of total dispersion, less than .05% of deacetylated chitin has given good dispersions.

The range of concentrations given, both of dispersed material and dispersing agent is for the purpose of illustration and is not to be taken as limitative. The grade of deacetylated chitin refers to the viscosity of the 5% solutions in 5.0% acetic acid at 25° C. Low viscosity materials range from about 1 to about 35 poises; medium from 35 to 250, and high viscosity materials above 250, often over 1000. Very low refers to material which will form only very brittle films and which is without fixing power, while very high refers to material having a viscosity too high for accurate measurement.

In the preparation of solutions of deacetylated chitin salts, at least 0.8 mol. of acid is normally required for each 161 parts of deacetylated chitin. In general, from 0.8 to one mol. of acid to 161 parts of deacetylated chitin have been used, although higher concentrations can be used.

The various grades of deacetylated chitin have been found to give good dispersions. While the medium viscosity types are very convenient to use, both low and high viscosity types serve equally well in most cases. For dispersions of very high solids content, the lower viscosity types are preferable in order that 5% of deacetylated chitin on the basis of the solid may be used. For low solids content, the high viscosity types have the advantage of giving more viscous solutions.

Having outlined above the general purposes and principles of the invention, the following applications thereof to certain specific instances are included for purposes of illustration and not in limitation.

*Example 1*

Twenty parts by weight of titanium dioxide pigment were dispersed in a solution of medium viscosity (shrimp) deacetylated chitin acetate to give a good stable dispersion comprising 20% pigment and 5% of dispersing agent. A fair dispersion was first made up by briefly agitating the pigment-solution with a drink mixer, and this improved by passage thru a colloid mill. This procedure very rapidly gave excellent dispersions, and is very generally applicable.

*Example 2*

A red lake (azo type color) and water, when put thru a colloid mill using 10% of pigment and no dispersing agent, came out as a very thick paste. Sufficient low viscosity shrimp deacetylated chitin (as the acetate) to equal 1% of the pigment was added, and on passing thru the mill a thin, low viscosity, dispersion resulted.

A large variety of materials have been similarly dispersed and include thiodiphenylamine, lead arsenate, barium fluosilicate, ethylene glycol di-beta naphthyl ether, titanium dioxide extended with barium and calcium sulfates, lithopone, barium sulfate, talc, asbestine, carborundum powder, calcium carbonate, china clay, paper makers' clay, chrome yellows, Milori blues, wall paper clays, carbon black, rose toner powder and paste (phosphotungstic acid colors), toluidine toner, lithol red toner, anthraquinone dyes (insoluble), phosphotungstic acid pigments and "Halopont Blue" crude, zinc sulfide, silica, blue lead, graphite, various iron oxides, red lead, madder lake, para toner, maroon lake, ultramarine blue, zinc chromate, chrome green, various titanates such as barium, magnesium or calcium titanate; water repellant pigments such as aluminum stearate, etc.

The maximum concentration of solid, all else being equal, varies with the material dispersed, lithopone, for example, permitting a higher solids content of the dispersion than titanium dioxide.

The materials containing calcium sulfate and carbonate were dispersed satisfactorily but set to 0.032% "Gardinol W. A." (sodium salts of sulfates of higher fraction of coconut oil alcohols including dodecyl, tetradecyl, etc.) concentrated powder, 0.032% 2-chloro-5-hydroxytoluene as mold inhibitor and 1.2% of deacetylated chitin (to pigment) as acetate. Paper coated with this dispersion showed excellent resistance to dry rubbing. With a 25% dispersion of titanium dioxide containing 3% of deacetylated chitin to pigment there was a slight rubbing off of pigment, but with 6% of deacetylated chitin, resistance to both wet and dry rubbing was good. The higher the proportion of binder used, the less was the tendency of pigment to rub off.

*Example 5*

A dispersion comprising clay, 80 parts by weight; barium sulfate, 20 parts; low viscosity deacetylated chitin, 7 parts; acetic acid, 2.5 parts; and water, 250 parts, gave a very satisfactory paper coating, taking ink well after calendering to give attractive prints.

For certain washable wall-paper colors, deacetylated chitin has been compared with casein. Tests were made with a chrome yellow and a rose lake, using 5% of deacetylated chitin to pigment. Casein and deacetylated chitin dispersions of pigments were brushed on paper. Tests indicated that one pound of deacetylated chitin was equivalent to about three pounds of casein in fixing power, and that the same relationships existed in waterproofing tests with casein plus formaldehyde. In addition, deacetylated chitin solutions have, and develop, no disagreeable odor, nor do they deteriorate or spoil rapidly.

Carbon black and Milori blue on being passed thru a colloid mill are dispersed as very finely divided solids with few large solid particles visible under the microscope. Dispersions containing 5% of pigment and 25% (based on the pigment) of low viscosity deacetylated chitin acetate were prepared by pebble mill grinding. After standing, the supernatant liquid was decanted off, and used as a paper coating. A smooth uniform coating was obtained which was flat black or blue and resistant to both dry rubbing and to water. On dry rubbing, a slight gloss was developed. These same dispersions were treated with glycerin and used as writing or drawing inks, being black or blue in color and waterproof immediately after drying. When used as a flat black paint, the carbon black dispersion was particularly effective, giving a uniform flat black coating, resistant to dry and wet rubbing.

When applied to fabric and dried, dispersions of pigments in deacetylated chitin withstand washing to a very considerable degree. Dispersions may serve for dyeing, delustering, printing, sizing, opacifying, etc., the fabric. The following examples show the printing and dyeing of the fabrics with dispersions of this type:

*Example 6*

The following dispersions in deacetylated chitin solutions were made up and used for printing designs on rayon.

A. 20% titanium dioxide using 10% of low viscosity deacetylated chitin to pigment.

B. 20% titanium dioxide using 10% of low viscosity deacetylated chitin to pigment with "hymolal salts".

C. 20% barium sulfate using 10% of low viscosity deacetylated chitin to pigment.

D. 20% titanium dioxide using 8% of high viscosity deacetylated chitin to pigment.

E. 20% lithopone using 8% of high viscosity deacetylated chitin to pigment.

F. A commercial delustering paste.

G. 0.55% Milori Blue —45% low viscosity deacetylated chitin to pigment.

H. Carbon black 2% using 25% low viscosity deacetylated chitin (as acetate) to pigment.

The prints were dried and the fabric laundered to demonstrate laundry-fastness. After 90 minutes total washing in an ABC washer with other clothing the commercial delustering paste was largely removed, the Milori Blue, carbon black, and barium sulfate but slightly, while the other prints were not visibly affected.

*Example 7*

Acetate and viscose rayon were "dyed" with Milori Blue pigment by immersing the cloth in a dispersion containing 2% of pigment and 10% of deacetylated chitin to pigment. One batch of cloth was pressed to remove excess liquid, the other rinsed in water. Rinsing removed some of the pigment, especially with the viscose rayon. After drying, both sets of samples were washed one hour at 85° C. in initially one-half per cent "Ivory" soap solution with very little loss of color.

*Example 8*

Dispersions were made up containing 20% of titanium dioxide and 4% and 2% of binder or dispersing agent respectively. Deacetylated chitin as acetate, gelatin, casein and glue were used in order that comparisons might be made. After printing on rayon, samples were dried at room temperature and at 85° C. while others were treated with formaldehyde or acetic anhydride i. e. a solution comprising glacial acetic acid and acetic anhydride. After boiling for one hour in initially one-half per cent "Ivory" soap, it was observed that in all cases the deacetylated chitin prints were not appreciably altered. The prints containing 2% deacetylated chitin to pigment were whiter than those containing 4%, and the acetic anhydride treated samples were both definitely whiter than the others. In all cases the prints made using other dispersing agents were almost obliterated, altho the casein was improved by the formaldehyde and acetic anhydride treatments. A similar test was tried out with barium sulfate extended titanium oxide pigment, but this pigment was dispersed and fixed only by deacetylated chitin at the concentrations used.

Deacetylated chitin acetate dispersions of Milori Blue, chrome yellow, and talc painted on canvas and exposed for seven months, including summer, fall and winter, to the weather gave clean surfaces while untreated portions of the canvas were dirty and sooty. Mildew inhibitors may be added to preserve the canvas.

The following example shows the use of dispersions of pigments in deacetylated chitin solutions in the delustering of fabrics. The dispersions are especially effective because of the firm fixation of the pigment to the fabric thereby.

*Example 9*

A dispersion comprising 25% of titanium dioxide pigment with 5% of high viscosity deacetylated chitin acetate was prepared and sufficient mold inhibitor added to protect the dispersion. Diluted to from 0.5% to 1.0% pigment concengels on standing, probably due to dissolved sulfate precipitating the deacetylated chitin in the one case and the carbonate neutralizing the acid in the latter. Additional acetic acid has been found to increase stability of calcium carbonate dispersions.

If not protected, dispersions of deacetylated chitin may mold altho this does not occur readily. The result of molding is in general the flocculation of the pigment or other solid but there is no development of an appreciable or disagreeable odor. Mold preventives in general can be used, including thymol, phenols, chlorocresols, hexyl resorcinol, and others. Unless reaction with the dispersed material occurs, there is seldom any appreciable change in the dispersions on standing for a period of months other than a certain amount of settling which varies from case to case.

Deacetylated chitin disperses pigment-like materials well in acid solution. Addition of alkali coagulates the deacetylated chitin which carries down the dispersed pigment with it. The filtered combination can be readily redispersed by adding acid and suitably agitating. Colloidal materials may thus be coagulated and filtered by adding deacetylated chitin and making alkaline, which precipitates the deacetylated chitin which carries down the colloidal material with it. This is illustrated by the following example:

*Example 3*

A 10% dispersion of colloidal titanium dioxide in hydrochloric acid was treated as follows:

a. Filtered. The dispersion filtered readily leaving no residue.

b. Treated with ammonium hydroxide and filtered. A small part of the titanium dioxide was coagulated and was removed on filtering but much went thru the filter. A more dilute system was not coagulated perceptibly by this treatment.

c. Treated with 10% of deacetylated chitin to solid and then with ammonium hydroxide. The coagulated material settled rapidly and the filtrate was essentially free from colloidal material. Addition of dilute acid redispersed the coagulated colloid to give a dispersion of colloidal titanium dioxide in deacetylated chitin solution.

Dispersions of finely divided solids may include other materials than deacetylated chitin. Thus, materials such as glue, gelatin may be added to modify the dispersing action, others such as "hymolal salts", (the alkali metal salts of higher alkyl sulfuric acids such as dodecylsulfuric acid or coconut oil alcohol sulfuric acids) or saponin improve the wetting of materials to which they may be added, others to increase fixing or anchoring, others such as thymol, chlorocresols, etc., to prevent mold formation, others such as glycerol, formamide or other softeners, etc., to modify the film properties, water resistance, and the like, penetration assistants such as hydroxyethyldimethyloctadecylammonium chloride, octadecylbetaine, etc.

Water insoluble materials liquid under the condition of preparation, such as oils, melted waxes, resin solutions, etc., may be emulsified with the dispersion and used in this way. Water soluble salts which do not precipitate the dispersion may be added. Chemical reagents for example those which react with the amine group may be added in suitable quantities. A small amount of formaldehyde, for example, will increase the viscosity of the solution and also its water resistance on drying. The number of materials and classes of materials which may be added is large and in general it is possible to select a material to modify any particular property of the dispersion.

The dispersions of the present invention find application for a large number of uses due to their unique properties, which include:

1. The unusually large variety of solids dispersed or deflocculated.
2. Their complete miscibility with emulsions or with dispersions in solutions of salts of deacetylated chitin.
3. Their lack of foaming in preparation and use.
4. Their stability toward hydrogen ion and towards heat.
5. Their film-forming properties.
6. Their adhesive properties.
7. The development of water resistance on drying, heating or chemical treatment.
8. Their stability in presence of many types of added compounds.
9. The unusual fixing properties of deacetylated chitin, i. e., the property of the dispersions when used to coat or impregnate paper, fabric, wood or other base materials and allowed to dry, of "fixing" the dispersed material so that it is not readily rubbed off, and in many cases, not washed off, even though the proportion of binder be low. The dispersions are normally positively charged, which factor often plays a part in their usefulness.

After treatments may be employed to alter the properties of coated or impregnated materials. Formaldehyde increases water resistance. Heating has the same effect. Acetic anhydride renders the coating resistant to water and acids and reduces any tendency to discolor on aging. Alkaline vapors or solutions rapidly neutralize any residual acid present and increase water insolubility. While chemical treatments may be applied at any time, more desirable results are usually obtained if the coated or impregnated object is essentially dry before the after treatment.

Dispersions of pigments in aqueous solutions of deacetylated chitin have been used for coating of paper. Such coatings show very good adhesion, being very resistant to rubbing off. When thoroughly dried, heated or specially treated as by ammonia or formaldehyde, resistance to wet rubbing is unusual, especially when 5% or more of deacetylated chitin to pigment are used. Dimethylol urea may be used to improve oil and grease resistance. Different pigments require different proportions of binder to give resistance to rubbing, but 5% to 10% is usually sufficient. "Hymolal salts" added to the extent of a few one hundredths of a percent on the basis of the solutions may be used to obtain smooth coatings. Care must be taken in using materials which contain sulfates which may coagulate deacetylated chitin even in quite low concentrations.

The following examples illustrate the applications of deacetylated chitin dispersions of solids in coating paper. Whenever the term "coating" is used, it is intended to include impregnating or the like, since in many cases, as in the treatment of fabrics, paper, etc., the fibers may be more or less coated in addition to the surface coating of the fabric, paper, etc., as a whole.

*Example 4*

Barium sulfate extended titanium dioxide was dispersed in an aqueous solution of the acetate of a medium viscosity deacetylated chitin to give a dispersion comprising 32% titanium pigment, tration, this dispersion was very satisfactory as a delusterant for fabric. The use of 0.1% salicylanilide in this concentrated dispersion was effective in the prevention of mildew. Piece goods and yarns were satisfactorily delustered by this dispersion. Waxes have been emulsified in the dispersion prior to delustering to give a water repellant delustered finish.

When pigments are dispersed in solutions of deacetylated chitin salts the resulting dispersions may be of high or low viscosity, depending upon the pigment-deacetylated chitin ratio and on the concentration and type of deacetylated chitin. When applied to paper; silk, wool, linen, cotton, canvas, viscose or acetate rayon or other cloth; wood; leather; and the like, and dried, such dispersions do not run when wet by water, or when wet by a similar dispersion in a deacetylated chitin salt solution, and are therefore useful for indelible, laundry, and drawing inks, artist's colors, non-bleeding showcard colors, etc., as illustrated in the following examples:

Example 10

Dispersions of titanium oxide, lithol red and chrome yellow were made up as follows:

Twenty-five parts by weight titanium oxide was dispersed in 75 parts by weight of 2% high viscosity deacetylated chitin acetate and diluted to suitable consistency with water. The deacetylated chitin was equivalent to 6% of the pigment.

Thirty parts by weight of chrome yellow was dispersed in 75 parts by weight of 2% high viscosity deacetylated chitin acetate and diluted with 195 cc. of water. The deacetylated chitin was equivalent to 5% of the pigment.

Twenty-five parts by weight of lithol red toner was dispersed in 125 parts by weight of 2% high viscosity deacetylated chitin acetate solution and 100 parts by weight of water added. The deacetylated chitin was equivalent to 10% of the pigment.

These dispersions were used as inks, using an ordinary pen, a little glycerin being added to aid flow by preventing drying on the pen. Once dry, the ink did not run when wet by water, nor did it wash off.

When these were used as drawing inks in a drawing pen, for making lines of various widths, ruling of one line over another after drying of the first, caused no bleeding of one color into the other and washing with water did not affect the drawing.

These dispersions were used with brush application and, after drying one color was applied over another without bleeding of one into the other. Water did not damage the finished article. The addition of a small amount of "Gardinol W. A." aided brushing, especially on wood and certain kinds of paper. Various colors were readily mixed and/or diluted with water.

These dispersions applied to leather, nitrocellulose coated fabric, book-binding materials, glass, tin, rubber, cork, etc., show good adhesion and resistance to rubbing and washing.

Blue inks were made using "Halopont Blue" or similar blue pigments, etc. These performed satisfactorily in fountain pens. Iron gallo-tannate inks, using ferrous chloride, may be pigmented with such blue dispersions.

Pigment-wax combinations have been found to be more resistant to rubbing, weathering, water, etc., than pigment dispersions alone. The various waxes, resins, oils, etc., which may be emulsified by deacetylated chitin may be used, either by mixing the emulsion with the pigment dispersion or preferably by making a mixed emulsion-dispersion at one and the same time. It may here be noted that an emulsion is an aqueous dispersion of a substance substantially insoluble in water and liquid under the conditions of emulsification, whereas the present application deals with dispersions containing solids which have not been liquefied in the aqueous system. The following example shows suitable mixed dispersion-emulsions and is representative of the many mixed emulsion dispersions which may be made using the materials disclosed in copending application Serial No. 11,274 of George W. Rigby, filed March 15, 1935.

Example 11

A dispersion containing the following was made up:

|  | Per cent |
|---|---|
| Titanium dioxide | 20.0 |
| Paraffin | 3.0 |
| Beeswax | 2.0 |
| Hexylresorcinol | 0.1 |
| Deacetylated chitin | 3.6 |
| Water | 69.0 |

Deacetylated chitin was equivalent to about 14% of combined pigment-wax.

Used as a leather coating, this composition could be rubbed to a gloss and could not be removed by rubbing, washing with water, dilute acid, soap or benzene. Applied to wood as a paint, after three months' southern exposure outdoors, it still showed coverage of the wood. Diluted slightly with glycerin and used as white ink, this composition was applied to the outside of a bill fold. After carrying in a hip pocket for seven months, including summer weather, thus representing severe conditions, the writing was in good condition. A commercial white drawing ink was removed in a few days.

Flat wall paints may be made with deacetylated chitin as the binder, giving an aqueous flat paint which, after drying, does not rub off and is resistant to water. Such paints may be made using a variety of pigments or pigment mixtures, either colored or white, pigment-wax mixtures, or pigment-resin systems, and the like, as is shown by the following examples:

Example 12

A. Fifteen hundred parts of lithophone was dispersed in 2000 parts of a solution containing 120 parts of deacetylated chitin as acetate and 0.6 parts of "hymolal salts" to give a flat paint of good brushing properties and marked rubbing and water resistance.

B. A mixture of 170 parts of extended titanium pigment and 18 parts of paraffin was dispersed in 300 parts of solution containing 15 parts of deacetylated chitin and 0.12 parts of hymolal salts concentrated powder. Brushing was good, as was resistance to dry rubbing while resistance to water was even better than the similar system without the wax.

C. Sixty pounds of barium sulfate extended titanium dioxide was dispersed in 80 pounds of aqueous deacetylated chitin solution containing 3 pounds of deacetylated chitin and 0.1 pound of hymolal salts concentrated. In this was dispersed 30 pounds of an oil-modified polyhydric alcohol-polybasic acid resin and the system tested as an emulsion type of flat paint. It had good brushing properties, and gave a satisfactory coating.

Other pigments, including colors or tinted whites and metal powders such as copper bronze may be used. For example a five percent dispersion of carbon black, using 25% of deacetylated chitin to pigment, gives an excellent flat black.

Deacetylated chitin paints are especially advantageous on cement, plaster, and other alkaline building materials since any neutralization of acid by the base material serves to increase the water insolubility of the coating rather than to damage it as is often the case with orthodox paints. Furthermore, the relative water permeability of many of these deacetylated chitin paints is advantageous.

Paper pulp may be caused to retain unusual amounts of pigment when deacetylated chitin is used for fixing the pigment to the pulp, as is shown by the following example:

Example 13

To 100 parts of a paper pulp containing 3% solids were added 1.2 parts of a titanium dioxide dispersion containing 0.3 parts of titanium dioxide, and .025 parts of deacetylated chitin. On making alkaline, the deacetylated chitin was precipitated, carrying down the pigment with it. Such a dispersion, properly diluted and cast into paper sheets shows unusual retention of pigment together with a definite sizing due to the presence of the deacetylated chitin.

While certain of the uses of deacetylated chitin-solid dispersions have been disclosed in detail, it may also be mentioned that these dispersions, especially pigment dispersons, are useful in plastic paints; in flat paints; in emulsion paints; in white inks, especially when combined with wax emulsions; as a binder for starch on paper; as a binder for putty and calking compounds; in pigmented collar sizes; in intaglio printing inks; as a binder for decorative flakes, or for fire-proofing or retarding materials; as a mordant for pigment in paper; as a fixative for non-fading pigments for auto tops; etc. Graphite may be dispersed and used in oilless bearings.

Abrasive paper and cloth may be made using dispersions of abrasives or by dusting abrasives on a paper or cloth coated with a deacetylated chitin film while the film is tacky and then insolubilizing.

For combined spotproofing and delustering fabric, dispersions comprising deacetylated chitin, paraffin or other waxes, titanium dioxide, and other pigments have been found to be of great utility. By the proper selection of pigment, it is possible to prepare shoe whites having good covering power and resistance to removal by rubbing. If glossy finishes are desired, inclusion of oils or waxes in the dispersions will aid. By using dispersions of pigments in deacetylated chitin solutions, printing may be carried out directly on regenerated cellulose films and the printed product is not damaged by hot or cold water. In the moth-proofing of fabrics, the moth-repellent material in the form of a finely divided solid, dispersed in a solution of a salt of a deacetylated chitin, is applied to the fabric and on drying, the repellent material is fixed to the fabric more firmly and permanently than without the deacetylated chitin. Where the moth-repellent is water soluble, it is much more permanently held by the deacetylated chitin film formed on the fabric.

In the use of dispersions of insecticides it is desirable that the insecticide adhere firmly to the plant or fruit, resist washing by rain and yet be capable of being washed off. Deacetylated chitin fixes insecticides generally such as barium fluosilicate, lead arsenate, etc., and renders the fixed product resistant to dry rubbing and to washing. Furthermore, the deacetylated chitin is readily redissolved by soaking in weak acid such as dilute acetic acid and scrubbing lightly.

As an anchor for finely divided solids, deacetylated chitin has many advantages including the large variety of solids which can be anchored thereby; the small amount of deacetylated chitin necessary for fixing; the large variety of base materials to which deacetylated chitin anchors material; and the remarkable water resistance developed by simple drying, or by heating or special chemical treatment.

On sprinkling a finely divided solid on a surface wet with a solution of deacetylated chitin acetate and drying remarkable adhesion is obtained. Similarly, an object coated with deacetylated chitin acetate solution and dried and then dipped into a suspension of a finely divided solid retains unusually large amounts of the solid when removed and dried.

When treated with alkaline media as $NH_4OH$, or even $NH_3$, water insoluble deacetylated chitin is formed, rendering the coating material water resistant. $NH_3$ is especially useful, since it can be applied effectively to the dry or essentially dry articles.

When heated, salts of deacetylated chitin almost always become insoluble in water, and generally also insoluble in acid. Deacetylated chitin itself, when heated for a considerable period, tends to become insoluble in acids. Chemicals in general which react with amines, will react with deacetylated chitin. Some of these will react at once; others can be added to the solution and will react only after the solutions are dried or heated. Formaldehyde or its polymers, for example, readily form insoluble compounds. They may be added to the dispersions or used in after treatments.

Acetic anhydride readily reacts in the cold. Thus, starting with a salt solution of deacetylated chitin, drying the salt, and heating the dry product, a product may be obtained which is no longer soluble in water, alkaline medium or acid medium. With the phthalic acid salt, a product is obtained insoluble in water or acid, but soluble in alkaline medium. With the nitrourea salt, the product is insoluble in acid, alkaline or neutral aqueous solutions.

While the invention has been described in detail in terms of deacetylated chitin obtained from shrimp or crab shells which are preferred because of their ready availability, the comparative ease of preparation of the deacetylated chitin, and the convenience of its use, the invention is generally applicable to the use, as dispersing and fixing agents, of deacetylated chitin insoluble in water or alkaline media but soluble in aqueous organic acid media and depositing coherent films therefrom, i. e., organic acid soluble deacetylated chitin. Instead of shrimp shell chitin, chitin derived from lobster shells or the outer integuments of insects such as locusts, grasshoppers, and the like, may be used. Chitin-containing materials from vegetable sources such as mycelium from fungi such as *Aspergillus niger* may likewise be used. For dispersons a wider range of viscosities may be employed even including rather highly degraded materials. The carbohydrate amine polymers which deposit coherent films are much preferred however in view of their extraordinary fixing power.

Where the term "deacetylated chitin" is used in the claims without recitations indicative of the material being in solution, the term includes derivatives such as the insolubilized formaldehyde treated, anhydride treated, etc., derivatives.

The above description and examples are intended to be illustrative only. Any modification of or variation therefrom which conforms to the spirit of the invention is intended to be included within the scope of the claims.

We claim:

1. A dispersion comprising a finely divided substantially unreactive and water insoluble material solid under the conditions of preparation of the dispersion dispersed in an aqueous solution of a salt of deacetylated chitin.

2. A dispersion comprising a finely divided substantially unreactive and water insoluble material solid under the conditions of preparation of the dispersion dispersed in an aqueous solution of an acetate of deacetylated chitin.

3. A dispersion comprising a finely divided substantially unreactive and water insoluble material solid under the conditions of preparation of the dispersion dispersed in an aqueous solution of a salt of deacetylated chitin containing an acid stable wetting agent.

4. A dispersion comprising a finely divided substantially unreactive and water insoluble material solid under the conditions of preparation of the dispersion together with a finely divided substantially unreactive and water insoluble material liquid under said conditions dispersed in an aqueous solution of a salt of deacetylated chitin.

5. A dispersion comprising a finely divided substantially unreactive and water insoluble material solid under the conditions of preparation of the dispersion together with a finely divided substantially unreactive and water insoluble material liquid under said conditions dispersed in an aqueous solution of an acetate of deacetylated chitin.

6. A dispersion comprising a pigment dispersed in an aqueous solution of a salt of deacetylated chitin.

7. A dispersion comprising a wax and a pigment dispersed in an aqueous solution of a salt of deacetylated chitin.

8. Process of preparing dispersions which comprises agitating together a material in the form of a finely divided substantially unreactive and water insoluble solid and an aqueous solution of a salt of deacetylated chitin.

9. Process of preparing dispersions which comprises agitating together a material in the form of a finely divided substantially unreactive and water insoluble solid and an aqueous solution of an acetate of deacetylated chitin.

10. Process of preparing dispersions which comprises agitating together a material in the form of a finely divided substantially unreactive and water insoluble solid and a substantially unreactive and water insoluble material in the form of a liquid and an aqueous solution of a salt of deacetylated chitin.

11. Process of coating objects which comprises applying thereto a coating of an aqueous dispersion comprising a finely divided substantially unreactive and water insoluble material solid under the conditions of preparation of the dispersion dispersed in an aqueous solution of a salt of deacetylated chitin.

12. Process of coating objects which comprises applying thereto a coating of an aqueous dispersion comprising a finely divided substantially unreactive and water insoluble material solid under the conditions of preparation of the dispersion dispersed in an aqueous solution of an acetate of deacetylated chitin.

13. A coated article of manufacture having a film on its surface of a composition comprising deacetylated chitin and a solid, said film being deposited from the dispersion of claim 1.

14. An article of manufacture bearing a coating thereon of a film of deacetylated chitin and superposed thereon and anchored thereby to said article of manufacture a finely divided pigment in discontinuous particles.

15. Process of coating objects which comprises applying thereto a coating of an aqueous dispersion comprising a finely divided substantially unreactive and water insoluble material solid under the conditions of preparation of the dispersion, together with a substantially unreactive and water insoluble material liquid under the conditions of preparation of the dispersion, dispersed in an aqueous solution of a salt of deacetylated chitin.

16. A dispersion comprising a titanium pigment dispersed in an aqueous solution of deacetylated chitin.

17. A dispersion comprising a titanium pigment and a mold preventive dispersed in an aqueous solution of a salt of deacetylated chitin.

18. A coated article of manufacture having a film on its surface comprising deacetylated chitin and substantially unreacting water insoluble material, said film being deposited from the dispersion of claim 4.

19. A dispersion comprising a pigment and a mold preventive dispersed in an aqueous solution of a salt of deacetylated chitin.

20. A dispersion comprising a titanium pigment and salicylanilide dispersed in an aqueous solution of an acetate of deacetylated chitin.

GORDON D. PATTERSON.
JAMES H. PETERSON.